US012026239B1

(12) United States Patent
Tougas et al.

(10) Patent No.: US 12,026,239 B1
(45) Date of Patent: Jul. 2, 2024

(54) AMBIENT SOUNDS-BASED AUTHENTICATION METHOD AND SYSTEM

(71) Applicant: UIPCO, LLC, San Antonio, TX (US)

(72) Inventors: Brian Tougas, Spring Branch, TX (US); William Daniel Farmer, Carrollton, TX (US); Ruthie D. Lyle, Durham, NC (US); Kelly Q. Baker, San Antonio, TX (US); Ryan Thomas Russell, San Antonio, TX (US); Noe Alberto Martinez, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 306 days.

(21) Appl. No.: 17/198,924

(22) Filed: Mar. 11, 2021

(51) Int. Cl.
*G06F 21/31* (2013.01)
*G10L 17/06* (2013.01)
*G10L 25/51* (2013.01)
*H04L 9/40* (2022.01)

(52) U.S. Cl.
CPC ............. *G06F 21/31* (2013.01); *G10L 17/06* (2013.01); *G10L 25/51* (2013.01); *H04L 63/102* (2013.01); *G06F 2221/2111* (2013.01)

(58) Field of Classification Search
CPC ......... G06F 21/31; G10L 17/06; G10L 25/51; H04L 63/102
See application file for complete search history.

(56) References Cited

U.S. PATENT DOCUMENTS

| 10,171,908 B1* | 1/2019 | Sinkov | G06F 40/169 |
| 10,665,244 B1* | 5/2020 | Gupta | H04M 3/5166 |
| 10,909,582 B1* | 2/2021 | Brandt | G06Q 20/4014 |
| 2006/0218621 A1* | 9/2006 | Covington | H04L 63/08 726/1 |
| 2016/0241555 A1* | 8/2016 | Vo | H04L 63/0861 |
| 2016/0371475 A1* | 12/2016 | Zhao | H04L 63/08 |
| 2020/0314649 A1* | 10/2020 | Yen | G10L 25/51 |
| 2020/0411014 A1* | 12/2020 | Asher | G10L 17/04 |
| 2023/0197085 A1* | 6/2023 | Dong | G10L 17/22 704/233 |

* cited by examiner

*Primary Examiner* — Matthew Smithers
*Assistant Examiner* — Shu Chun Gao
(74) *Attorney, Agent, or Firm* — Plumsea Law Group, LLC

(57) ABSTRACT

A sound-based method and system of performing an authentication of a person in order to permit access to a secured resource is disclosed. The system and method are configured to collect audio data from an end-user in real-time that corresponds to ambient sounds for their alleged location. The audio data is compared to verified audio data for the actual location. The system can determine whether there is a match between the user audio data and audio data previously collected and stored in a database or obtained from an audio service provider. If there is a match, the system verifies an identity of the person and can further be configured to automatically grant the person access to one or more services, features, or information for which he or she is authorized.

19 Claims, 10 Drawing Sheets

AMBIENT SOUNDS-BASED AUTHENTICATION METHOD AND SYSTEM

TECHNICAL FIELD

The present disclosure generally relates to identity authentication, and specifically to a method and system for authentication of a person seeking access to one or more secured services, features, and resources. The authentication is based on analysis of a sound sample produced in the physical environment occupied by the person.

BACKGROUND

Organizations may provide authorized end-users with various secured services or resources via multiple communication channels. Examples of such channels include modes of communication (e.g., a communications network) for exchanging data between devices, where such devices may include, but are not limited to, computing devices, such as tablets, personal computers, and smartphones; point of sale devices; ATMs; connected smart devices, such as refrigerators, watches, and laptops; telephones, such as landline telephones or mobile phones; electronically locked spaces managed by computer user interfaces, such as safe deposit box chambers, lockers, cars, offices, homes; and face-to-face contacts, such as interaction between a user and an employee of the organization. Channels may also include software and firmware associated with the devices and communications devices, such as web portals, applications, networks, mobile applications, and instant messaging systems. Channels may also include hardware associated with the computing devices and telephones, such as the network hardware, credit card scanners, and retinal scanners.

In most scenarios in which an end-user attempts to access a secured resource via one or more of these channels, the end-user will be required to provide some proof of identity, typically associated with an identification card, key-card, fingerprint, or other factor before access is granted. Personal computers (computing devices) pose additional complexities in authenticating users. Computing devices are commonly used by more than one person. It is generally not safe to assume that the identity of the computing device satisfies the ownership factor. Additionally, computing devices have been more easily compromised than other devices. Current solutions increase security, but are often inconvenient for users.

Thus, authentication (i.e., identifying and verifying) of an end-user can be time-consuming for both the end-user and the organization, as well as burdensome for users who are required to carry and present the necessary identification credentials and/or keys, or memorization of passwords or codes. It may be appreciated that many businesses and other organizations would benefit from mechanisms by which to reduce the costs associated with the authentication and authorization of customers. Furthermore, customers will be attracted by an authentication system that reduces or even eliminates the need to carry or remember multiple unique identification factors, as well as a system that significantly improves account security.

There is a need in the art for a system and method that addresses the shortcomings discussed above.

SUMMARY

In one aspect, a method of authenticating an identity of an individual is disclosed. The method includes a first step of obtaining first audio data at a first time from a first computing device associated with a first user located in a first space. The first audio data include ambient sounds for the first space. A second step includes accessing a first record stored in a database, where the first record includes second audio data linked to a first user identity. A third step includes determining that the first audio data and the second audio data are sufficiently similar to be classified as a match, and a fourth step includes determining, in response to classifying the first audio data as matching the second audio data, that the first user has the first user identity. Furthermore, a fifth step includes authenticating the first user for access to a secured resource for which the first user identity is authorized.

In another aspect, another method of authenticating an identity of an individual is disclosed. The method includes a first step of obtaining a first audio sample at a first time from a first computing device associated with a first user located in a first space, the first audio sample including ambient sounds for the first space. The method also includes a second step of obtaining a second audio sample from an audio capture device located on-site in the first space at a second time that is at or around the first time, the second audio sample corresponding to ambient sounds for the first space. In addition, the method includes a third step of determining that the first audio data and the second audio data are sufficiently similar to be classified as a match, a fourth step of determining, in response to classifying the first audio data as matching the second audio data, that the first user has a first user identity, and a fifth step of thereby authenticating the first user for access to a secured resource for which the first user identity is authorized.

In another aspect, a system for authenticating an identity of an individual includes a processor and machine-readable media. The machine-readable media include instructions which, when executed by the processor, cause the processor to obtain first audio data at a first time from a first computing device associated with a first user located in a first space, where the first audio data includes ambient sounds for the first space. In addition, the instructions cause the processor to access a first record stored in a database, where the first record includes second audio data linked to a first user identity, and to determine that the first audio data and the second audio data are sufficiently similar to be classified as a match. Furthermore, the instructions cause the processor to determine, in response to classifying the first audio data as matching the second audio data, that the first user has the first user identity, and authenticate the first user for access to a secured resource for which the first user identity is authorized.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
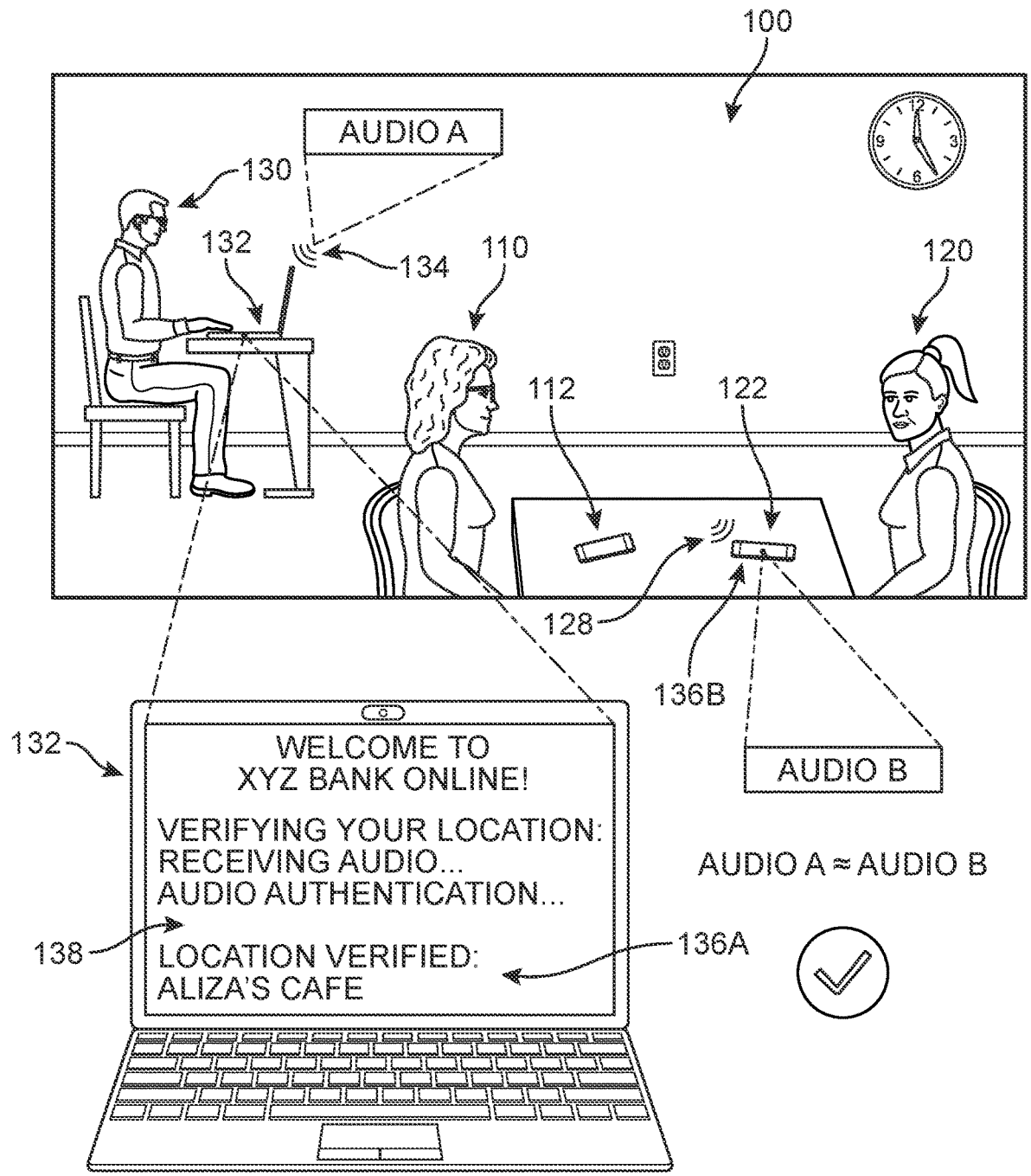
FIG. 1 is an overview of a scenario in which audio data from a user's device as well as audio data from the environment near the user is obtained in order to determine an authenticity of the user, according to an embodiment.

The embodiments provide a method and system allowing users to be authenticated in a more secure and more efficient manner. As described in greater detail below, an authentication process and system based on audio data from the environment or physical space occupied by the user may be utilized for reducing and in some cases eliminating the need for users to present credentials, input passwords, or otherwise offer identity tokens or factors, and/or provide account holders with an additional layer of security or verification. The proposed system takes advantage of the increasing reliance on teleconferencing and the growing availability of microphones in the day-to-day life of the modern consumer. By capturing audio information or sound cues from the environment associated with a specific user, user service sessions can be securely authenticated by confirming the user is in fact at the location he or she has indicated or as indicated by the user's device. For example, such authentication can be performed by confirming that an expected sound(s) in the background of the user are present prior to permitting access to a secure resource. In other examples, the authentication can be based on audio samples that are obtained from other persons' devices in the same area, and/or on audio samples obtained from third-party services.

It may be appreciated that the proposed embodiments can be advantageous in combating the growing threat of forgery. For example, deep fake algorithms in particular are becoming increasingly sophisticated. By generating a voice and/or face through a deep learning neural network, such algorithms are able to replace a real person with an imposter fake face/voice in real time. Such algorithms can be implemented using both Artificial Intelligence (AI) and Machine Learning (ML) to 'trick' a secured system into releasing confidential information. While existing technologies allow digital watermarks to be added to images, videos, and audio files or streams to ensure the authenticity of distributed media, the use of such technologies is typically controlled by producers of the media rather than by a speaker within a video. As will be discussed below, the proposed systems can further be configured to verify a user's identity with minimal user effort and offer a simplified, efficient, and ultimately highly convenient process by which to authorize and grant the user access to secured resources. Such systems can rely on device infrastructure that is already in place for video and image recording, making it simple to deploy at a low cost.

References to various aspects of access management will be discussed throughout the following disclosure, including identification, authentication, and authorization. For purposes of this application, the term 'identification' refers to the process of associating a user with something that has occurred on a server, on a network, or with some other resource, and typically occurs when a user (or any subject) claims or professes an identity. Traditionally, the process of identification can be accomplished with a username, a process ID, a smart card, or anything else that can uniquely identify a subject. In addition, the term authentication refers to the process of proving (or verifying) an identity, and typically occurs when subjects provide appropriate credentials to prove their identity. For example, when a user provides the correct password with a username, the password proves that the user is the owner of the username. Thus, the authentication provides proof of a claimed identity. As a general matter, three main methods of authentication include (a) user knowledge, such as a password or PIN; (b) user possession, typically provided by the secured system, such as a key, smart card, CAC (Common Access Card), PIV card (Personal Identity Verification card), RSA, or other card or token, magnetic stripe cards, certificates with a digital signature, etc.; and (c) biometric factors, such as voice recognition, retinal and fingerprint scans, etc.

Authorization refers to the concept of allowing access to resources only to those permitted to use them. In other words, authorization is a process that protects resources by only allowing access by consumers that have been granted authority to use or receive them. Some examples of such resources include individual files' or items' data, computer programs, computer devices and functionality provided by computer applications, as well as more tangible resources such as ATMs, banks, vaults, offices, or other spaces with specific security requirements. In addition, the use of the term "secured resources" refers to services, features, or other resources (physical and digital or virtual) that are access-restricted and are designed to be made available only to users that have been authenticated and authorized for such access. The term "passive" refers to the concept of a system and method that is not dependent on any particular 'active' interaction of a person with a device resulting from a change in the person's normal activity or behavior. In other words, walking and moving from one location to another are passive interactions, as the person would perform these activities regardless of the authentication system that is in place. However, other user actions, such as but not limited to providing a voice command, passcode, retinal scan, carrying and presenting an identification credential or token, fingerprint scan, etc. are active inputs and a system requiring any of these types of information would not be considered passive.

Organizations and businesses often provide support to customers by making available to their customers one or more member service representatives (MSRs) or other customer representatives and service agents (referred to generally herein as "agents") who have access to networked computers, telephones, often networked to a larger corporate computer network, including mainframes, microcomputers and LANs. For example, voice and data pathways into the center can be linked through routing servers and computer telephony integration (CTI). In some cases, CTI also facilitates interfaces with customer support servers in addition to any e-mail system, databases and web-based services.

As used herein, the term "customer service representative" (or simply, "representative") refers to any individual operating in a capacity to represent a service provider in interactions with a customer or user. The representative could be, for example, an employee at call center or a contractor or other person acting on behalf of call center for the service provider. Additionally, representatives may be physically present at call center and/or may be located remotely from call center and have calls routed through a computer system at call center to connect customers with the representative. A representative could operate within a larger customer service system (or department) of the service provider. For example, a bank could provide a customer service system that allows users to speak with representatives to help them obtain their account balances, pay bills, apply for and/or discuss loans, transfer money between accounts, wire money, get access to online services, troubleshoot technical problems associated with the bank's website, ask questions about forms and documents, as well as to help with any other suitable needs a user (or customer) might have. As another example, an insurance company could provide a customer service system that allows users to speak with representatives to help them with insurance policies and claims, as well as to help with any other suitable needs a user (or customer) might have.

A customer may contact or be contacted by an MSR to learn more about a service or product, obtain guidance, or purchase various items. Implementations of the proposed systems and methods may also include interactions with an agent, virtual or human, of a secured system. This service representative or agent is stationed at a location that is remote relative to the customer's location, such as a call center. As used herein, the term "customer" or "user" should be understood tor refer to any end-user or person requesting or receiving assistance or other communications from a secured system, including via a communication session with a remote agent. The customer can view at least one aspect of the interaction through a display of their computing device.

It may be appreciated that conventional methods of authentication rely heavily on identification documents or other tangible items provided by the system administrators that users are required to carry on their person and present when prompted, and/or intangible factors such as memorized passcodes or security questions and answers. However, such tokens have significant shortcomings. For example, they can be lost, stolen, or forged. In many cases, an individual may need to carry multiple identification cards or tokens, which may be unwieldy. Furthermore, less tangible factors can be burdensome, requiring memorization or physical contact or a particular physical position or proximity with a device. The following systems describe a process of authentication that does not rely on such factors, and can serve as a barrier to deep fake imposter attacks.

For purposes of introduction, an overview of one embodiment of the proposed systems and methods is illustrated with reference to FIG. 1. In FIG. 1, an example of an authentication process is shown in which a first user 130 is engaged in a tele-video conference with the goal of being authenticated and obtaining access to their account. First user 130 is seated in a coffee shop 100 during the conversation with the service representative (not shown). In different embodiments, first user 130 can participate in the communication session via a telephone or a computing device configured with a network connection, depending on the mechanism utilized for data transmission. In this case the first user 130 is speaking and listening to the call via a client device 132 (here shown as a laptop). However, in other embodiments, no computing device is necessary to implement the disclosed systems, and a traditional telephone service may be used by the customer or other caller. A person may contact or be contacted by a support agent or other service representative to, for example, learn more about a service or product, obtain guidance or help, review or make changes to their account settings, transfer or manage funds, or other various activities that may be supported by the service provider. For purposes of this example, the first customer 190 has just been connected to a support agent (not shown) and is seeking access to their account.

In different embodiments, the client device 132 can include an electronics unit comprising a plurality of different components, such as a user interface component (e.g., a touchscreen display, keyboard, mouse, microphone, speaker, etc.), a user interface module, a processor, and/or a communication module. The client device 132 may include a system including one or more processors and memory. Memory may comprise a non-transitory computer readable medium. Instructions stored within memory may be executed by the one or more processors. The client device 132 may be configured to receive and analyze data from various input sensors associated the client device 132 or data that is communicated from external components or devices to client device 132. In some cases, the client device 132 may also include a navigation system equipped with a GPS receiver that can receive GPS information or other receivers capable of receiving global or local positioning information.

A communication module may allow the client device 132 to communicate wirelessly. In this case, the communication module is illustrated as a wireless connection; however, wired connections may also be used. For example, the communication module may include a wired serial bus such as a universal serial bus or a parallel bus, among other connections. The communication module may also include a wireless connection using Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities.

In different embodiments, the client device 132 includes a device display ("display") 138 that can, for example, present information and media for a product/service support software application ("app"). In some embodiments, the app is associated with the provider of the product/service for which the service representative is offering support. In one embodiment, client device 132 could operate in a client-server relationship with one or more servers of a remote/cloud-based computer system. For example, the computer system may include a server that communicates with client device 132 as well as other remote devices (e.g., user devices of other customers) over a network 106. Client device 132 may provide the front-end of a system that provides users with options for performing various kinds of tasks (for example, making fund transfers when the company is a bank). In some cases, client device 132 may run client software through a web browser, in which case the client software may be hosted on a server associated with the computer system. In other cases, client device 132 may run client software in the form of a native software application that has been downloaded through a centralized marketplace (i.e., an "app store"). In some cases, while the client software that allows users to perform various tasks may be run on client device 132, the data may be retrieved from and stored on databases associated with the computer system.

In some embodiments, the first user 130 can receive and send information through a user interface for the app that may be presented on the device display 138. In some embodiments, display 138 may be a touchscreen, allowing the customer to interact with the user interface directly by touch. The user interface may refer to an operating system user interface or the interface of one or more software applications that may run on the client device 132. In some embodiments, the user interface can include a messaging window or other chat-space by which the service representative may send messages or other digital content. Alternatively, in some embodiments, the first user 130 can also speak with the service representative via a voice calling application on client device 132, or directly through a telephone or other external device.

The first user 130 is communicating with a service representative of a first service provider for which he is an account holder/member, for example via a first service app ("first app") 136A. In this example, a remote access management system is configured to passively verify an identify of a person so as to either permit or deny access to the user-identity dependent services provided by the service representative, located at a remote site (not shown here). As used herein, the term "user" or "member" or "account holder" should be understood tor refer to any end-user or person requesting or receiving assistance or other communications from a support agent or service representative. It should be understood that while the following description presents a sequence of examples illustrating the use of the proposed systems and methods in a customer-agent dynamic, in other embodiments, the proposed systems may be utilized by a broad range of end-users, including other types of work calls and corporate calls.

As shown in FIG. 1, at a table near first user 130, a first customer 110 and a second customer 120 are enjoying a conversation together in the coffee shop 100. As is typical in today's society, each customer is accompanied by their personal mobile device, where first customer 110 has a first mobile phone ("first phone") 112 and second customer 120 has a second mobile phone ("second phone") 122. Furthermore, for purposes of this example, second customer 120 can be understood to have an instance of app 136B running on second phone 122, where the reference letter "A" indicates a first instance of the app 136 (running on the client device 132), and the reference letter "B" indicates the second instance of the app 136 (running on the second customer's device).

In some embodiments, the ambient sound from the surrounding environment or physical space can be used to help verify the authenticity of a person's location. In general, the term ambient noise information or sounds refer to the sound profile collected for a particular location or space during normal, day-to-day use of such space. A physical space can refer to any physical environment such as a room in an office, residence, or other building, as well as open or outdoor spaces. In this case, the physical space is the portion of the coffee shop 100 that is directly around and near the first user 130. As the first user 130 requests access to his account or other secured resource, the remote access management system can automatically, or at the request of the service representative, initiate an authentication event, action, or task.

In different embodiments, the access management system can then request or trigger a capture of a sample of audio data (labeled in FIG. 1 as "Audio A") by a first microphone 134 of (or connected to) client device 132. Audio A is then transmitted to the remote access management system. At or around the same time, the remote access management system determines that among the computing devices near to the client device 132 is another device running app 136b. In response to this determination, the system can automatically, or at the request of the service representative, request or trigger capture of a sample of audio data (labeled in FIG. 1 as "Audio B") by a second microphone 128 of (or connected to) second phone 122.

Based on the received audio signals (Audio A and Audio B), the system will determine whether there is a match between the two audio samples. If a match between Audio A and Audio B is detected, the user's location can be verified, providing an additional layer of veracity to the user's identity. In this example, Audio A and Audio B are sufficiently similar, and the system automatically communicates this information to the service representative. Thus, in FIG. 1, without further action or presentation of credentials by first user 130, the communication session can proceed with permitting first user 130 with access to the account linked to the authenticated identity of the first user 130. The first user 130 is then able to make account requests and/or receive sensitive account information.

While in some embodiments the system may incorporate additional layers of authentication that may supplement the authentication process, such as facial recognition, voice recognition, fingerprint recognition, password or pin-code verification, or other such factors, it may be appreciated that the system can be readily implemented without such additional steps. In other words, the first user 130 is able to obtain access to the desired secured resources without an identification card, debit card, or other system-provided token typically presented for such occasions. The system thereby allows the user to be passively (i.e., 'touchlessly') authenticated. In some embodiments, the system is further configured to automatically provide the user with access to the secured service linked to the user's unique account, in response to the authentication that is performed based only or primarily on the ambient sound data captured for the environment around first user 130.

Figure 2:
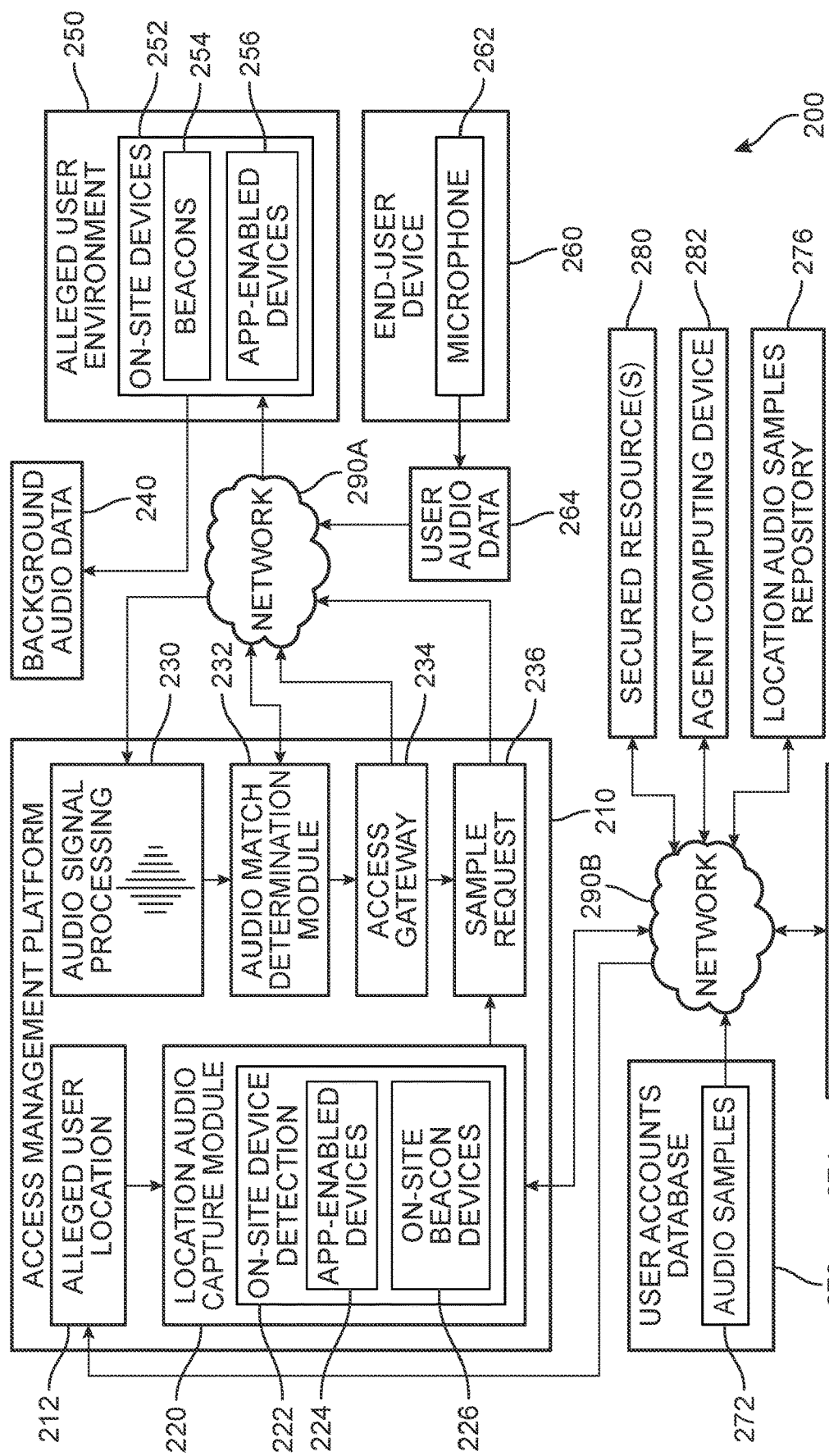
FIG. 2 is an overview of an architecture of an audio-based authentication system, according to an embodiment.

For purposes of clarity, an overview of a system architecture ("architecture") 200 for an embodiment of an access management system is depicted in FIG. 2. It should be understood that the architecture 200 as presented is for purposes of illustration only, and other embodiments may utilize different or additional components or processes. The architecture 200 may alternatively include additional, fewer, or different components. For example, the architecture 200 may include additional storage devices, additional servers, additional computing devices, and other features not shown in FIG. 2.

In FIG. 2, the architecture 200 can be seen to include an access management platform ("platform") 210, an end-user device ("user device") 260, and an optional agent computing device ("agent device") 282. In some embodiments, the platform 210 includes or is configured to communicate with a user accounts database ("database") 270. Furthermore, in different embodiments, architecture 200 includes access to devices in alleged user environment 250, third-party supplied location audio feed 274, and/or a location audio samples repository ("samples repository") 276. Devices and components of architecture 200 can communicate with each other and with other components of architecture 200 over one or more networks (shown here as 290A and 290B, and referred to collectively herein as 290).

In different embodiments, the networks 290 may comprise any number of electronic devices and use any number of communication protocols to facilitate data communications within the network 290. One having skill in the art would appreciate that the network 290 may include a variety of internal and/or external networks 290 of various types implementing various data communications technologies. The communication over the network may be performed in accordance with various communication protocols such as Transmission Control Protocol and Internet Protocol (TCP/IP), User Datagram Protocol (UDP), and IEEE communication protocols. The networks 290 can include a wireless (e.g., Wi-Fi, Bluetooth®) or wired data network, a cellular network, a telecommunications network, an enterprise network, an application-specific public network, a Local Area Network (LAN), a Wide Area Network (WAN), WLAN, MAN, a private network, a public network such as the Internet, an ad-hoc network, a network that includes a satellite link, or another type of data communication network. The network 290 may include a physical and/or logical architecture defined by firewalls, proxy servers, routers, switches, or similar features that implement various levels of security and my function as logical gateways or boundaries.

In different embodiments, agent device 282 and user device 260, as well as platform 210 can be configured to work in conjunction with a telephony/videoconferencing application ("application") such as a telephone connection or teleconferencing software application. For example, implementations described herein may be performed via any electronic communications between an agent and a customer including, but not limited to, telephone, video telephone, chat (e.g., IM, Slack™, Jabber™), video chat (e.g., Skype™, MS Teams™, Zoom™, Facetime™) internet based meetings (e.g., WebEx™), custom call-center systems, and other conference call systems. In addition, application can be configured to present various interfaces by which administrator or other users can interact with features of platform 210. In some embodiments, the application is proprietary to the service provider for which the agent is a representative.

In some embodiments, the platform 210 is capable of communicating with external devices such as agent device 282 (also referred to herein as an administrator computer) and the user device 260 (also referred to herein as the audio capture device) through the network 290 using wired or wireless communication capabilities. The platform 210 can be understood to comprise a server and, along with the agent device 282, may include computing devices comprising any number of components, such as a Network Interface Card (NIC), allowing the respective devices to receive, transmit, process, and store information obtained from the image capture devices. In other words, the architecture 200 may include groups or subgroups of computing devices that can communicate with each other, but not necessarily with the computing devices in other groups or subgroups. The architecture 200 may include computing devices of disparate types, having different types of hardware and software configurations and in a variety of different locations. In some cases, multiple devices or subsystems can be identified together as a single computing device.

The platform 210, agent device 282, and user device 260 may include one or more processors, non-transitory machine-readable storage media, and a data communication interface (e.g., NIC card), as well as user interface devices, for example, a monitor, touchscreen, mouse, or keyboard. These components can be implemented as computing devices or mobile devices, such as smart phones, personal digital assistants (PDAs), portable media players, watches, glasses, laptops, notebooks, tablets, and others, and can include work stations, mainframes, non-portable computing systems, devices installed in structures, vehicles, and other types of installations.

In different embodiments, the platform 210 includes or is configured to access one or more databases, such as member profile or user accounts database 270 and/or samples repository 276. The user accounts database 262 is a content library that stores account data related to one or more users. The data may include, for a plurality of users, name, personal and professional details, current and past policy for the user, credit limit of users, among other details, depending in part on the type of services being provided by the service provider. In one embodiment, user accounts database 262 includes audio samples collection 272 specific and unique to each user. For example, a user may have captured and provided to the system a recording of the ambient sounds of their various personal spaces. In some embodiments, a user may opt to register multiple audio samples or security tokens with his or her account. For example, the user may have one audio sample saved for when he or she is at home, a second audio sample saved for when he or she is at work, a third audio sample saved for when he or she is in their vehicle, etc. The user can identify the location in which he or she is calling from or is otherwise submitting the sample audio from, and the system will tag the sample accordingly.

In addition, in different embodiments, the user may opt to provide audio data updates at different intervals. For example, the user may move residences or change jobs, or experience some other change that may affect the validity of the security token previously stored, and therefore he may request to submit new audio data. In other cases, the merchant or other authentication entity may require or recommend that participants provide new audio data twice a year, once a month, or at other less or more frequent intervals to ensure the security token that is stored is up-to-date. In one embodiment, the security token can be associated with an expiration date or period of time after which the participant will be required to provide new (current) audio data. In some embodiments, an account for the customer verifying their identification credentials can also be linked to the customer's security token at or around that time. Thus, a verification process may occur in conjunction with the collection of the initial audio sample(s), whereby the participant presents identity documents that can be used to confirm the user's identity. The user identity can then be linked to the security token in the record. These samples can be used as personalized reference/verification audio by an audio match determination module 232, as will be discussed below. In some embodiments, such reference audio may be provided during an enrollment phase, and stored in the audio samples collection 272 for later use. These audio samples will be linked to the specific user account listed in user accounts database 270.

Furthermore, the samples repository 276 stores audio data in which sounds for a wide range of location types are identified, labeled, and/or tagged (referred to collectively as audio content). In one embodiment, each audio content has associated metadata, such as keywords, tags, or a textual description of the audio content. In some embodiments, the samples repository 276 may store pre-recorded audio patterns and samples that are understood to represent background or ambient noise for specific (usually public) locations and/or specific types of locations, such as airports, bus stations, grocery stores, retail stores, schools, offices, recreation centers, amusement parks, vehicles, restaurants, theaters, etc. One example of an implementation of the access management system in which samples repository 276 is used is provided in FIGS. 3-6 below.

In different embodiments, the user device 260 may further include a microprocessor, a communication unit, random access memory (RAM), non-volatile memory, a display, one or more auxiliary input/output (I/O) devices, a data port, a keyboard, a speaker, a microphone 262, a short-range wireless communications subsystem, a rechargeable battery, a battery interface, and possibly other components. The user device 260 may include fewer, additional, or different features, which may be arranged and may operate in the manner shown or in a different manner. The user device 260 may communicate over wireless networks, including wireless telecommunication networks, wireless data networks, combined voice and data networks, or other types of wireless networks. The networks can include one or more local, regional, national, or global networks. The networks can include one or more cellular networks. In some implementations, wireless networks utilize one or more communication protocol standards, for example, 3G, 4G, GSM, CDMA, GPRS, EDGE, LTE or other.

In some embodiments, user device includes a GPS receiver that can receive GPS information or other receivers capable of receiving global or local positioning information. In other embodiments the user may communicate their location directly (e.g., via message or voice). This alleged (i.e., purported, unverified) user location information 212 can be submitted to the platform and received by a location audio capture module 220. The location audio capture module 220 is configured to evaluate the alleged user location information 212 and determine whether there are on-site audio capture devices via an on-site device detection module 222. For example, the location audio capture module 220 can check whether the location includes any personal devices that are running an instance of the app (app-enabled devices 224) and have consented to ambient sound capture, as well as any on-site beacon devices 226. Beacon devices 226 refer to audio capture devices that are stationed permanently or semi-permanently at a particular location. These types of audio devices will be discussed in greater detail with reference to FIGS. 7-9 below.

If the location audio capture module 220 identifies devices 252 on-site in the alleged user environment 250, it may issue a sample request 236 to one or more of those devices, such as on-site beacons 254 and/or app-enabled devices 256. In cases where no such device is available, or when system settings dictate the bypassing of such devices, the location audio capture module 220 can be configured to reach out to other sample provider sources via an external sample provider retrieval module 228. For example, as noted earlier, the platform 210 may include or have access to location audio samples repository 276, which can store audio data for the alleged location that may be used as reference audio. In another example, the platform 210 may have access to other sources, such as third-party managed audio feeds 274 for the location. Thus, if a public space has a recording system, it may offer access of its audio, including live or real-time audio, to the service provider for use by platform 210 as representing ambient background noise for that public space.

As noted above, in different embodiments, the user device 260 includes microphone 262 that is linked to or otherwise integrated within a unit configured to capturing sounds in user environment 220. When a user requests access to a secured resource, for example via a user interface presented on user device 260 via network 290, the sample request 236 may be generated by platform 210, requesting a sample of user audio data 264. In some embodiments, user device 260 is configured to send captured audio content to remote facilities such as the platform 210 and/or the agent device 282.

In different embodiments, audio signal processing algorithms and/or software (e.g., audio signal processing module 230) may reside in user device 260, platform 210, agent device 282, and/or other devices of architecture 200 for pre-processing and processing of the captured user audio data 264 and background audio data 240 (e.g., captured by on-site beacons 254 and/or app-enabled devices 256 at the alleged user environment 250). The algorithms can use some combination of time and frequency to determine whether two audio samples match. In one embodiment, the platform 210 is configured to compare the user's audio sample (user audio data 264) against the reference audio sample (e.g., background audio data 240 or other data obtained from location audio feed 274 and/or samples repository 276). If the samples match within certain parameters, the user is deemed to pass the authentication or verification test, indicating that the user is indeed at the alleged location.

In some embodiments, the user audio data 264 and background audio data 240 are processed and models or representations of the two samples of audio are built. These models are compared against one another. In different embodiments, one or both samples may be deemed unacceptable or unusable if the sample is too loud or too soft (amplitude), or if there is too much noise (poor signal to noise ratio). If a sample is not acceptable the system may request an additional or further sample.

If the samples are acceptable or sufficient, a scoring occurs via audio match determination module 232. The scoring process is analogous to "what is the probability that the ambient sounds captured by the user device are the same as the verification sample for that location?" Thus, the determination of a "match" is not necessarily based on the verification/reference sample directly or exactly matching the content of the user audio sample, but rather on the two samples being substantially similar or sharing particular features. The returned score is evaluated against a threshold value to determine if it meets or exceeds the minimum acceptable score by access gateway 234. If the score is determined to be successful, the platform 210 and/or agent may allow a user to proceed further within a call center or telephone banking menu system or other secured resource 280 being safeguarded by the service provider. In other words, the two audio data samples are compared by the audio match determination module 232, and if a match is found or is in an acceptable range, the access to secured resource(s) 280 by the user 260 will be allowed and/or enabled by access gateway 234. Otherwise, access is denied pending further verification. Thus, authentication based on verification of the user's location using ambient noise strongly implies that the user's identity is true and correspondingly is in fact entitled to whatever access is being requested. It should be understood that while the platform 210 bases access decisions at least in part on the detection of the designated object token, the system is further configured to first confirm that the user ID and optional password match based on information available in the user accounts database 270.

Although not shown in FIG. 2, it should be understood that a support agent (human or virtual) can be connected to and interact with customers via a call management or customer support server that can manage the distribution, transfer, and handling of various calls that come into the support center. For example, a customer may be routed via the customer support server to an appropriate agent computing device associated with a particular member service representative (MSR) better suited to respond to the particular caller. In different embodiments, the agent device 282 can be connected to or include an internet customer interface for providing support specifically to customers or members who contact them via the Internet. As a general matter, support agents or service representatives can refer to any person or personnel who offers the caller (or person who was called) assistance, and has access to the platform 210 during the communication session with the customer.

Referring now to FIGS. 3-6, an example of an authentication process of a user identity that may occur using some of the proposed systems is depicted. In this case, a second user 310 is engaged in a communication session with a first service agent ("first agent") 330 who is located in a remote location relative to second user 310, such as a call center 350. The second user 310 is speaking to the first agent 330 via a telephone 320, and the first agent 330 is responding over a computer-based telephony system 340 that includes or otherwise has access to an embodiment of an access management platform 360 (e.g., see platform 210 in FIG. 2). In other embodiments, the communication can occur in part or fully via a video conferencing interface whereby the first agent 330 and second user 310 speak in real-time over two computing devices.

Users of the authentication system described herein can be understood to have provided their consent to the audio-based authentication process at the time of their original account activation or enrollment with the additional security layer procedure. The session is occurring at a time subsequent to the audio data enrollment/submission stage described earlier. In other words, the account holder that second user 310 is claiming to be has previously provided audio data for one or more personal spaces with the goal of enrolling or registering himself in this particular authentication technique, and the audio token that was acquired at that time is stored in a record in a database accessible by the depicted authentication system.

Figure 3:
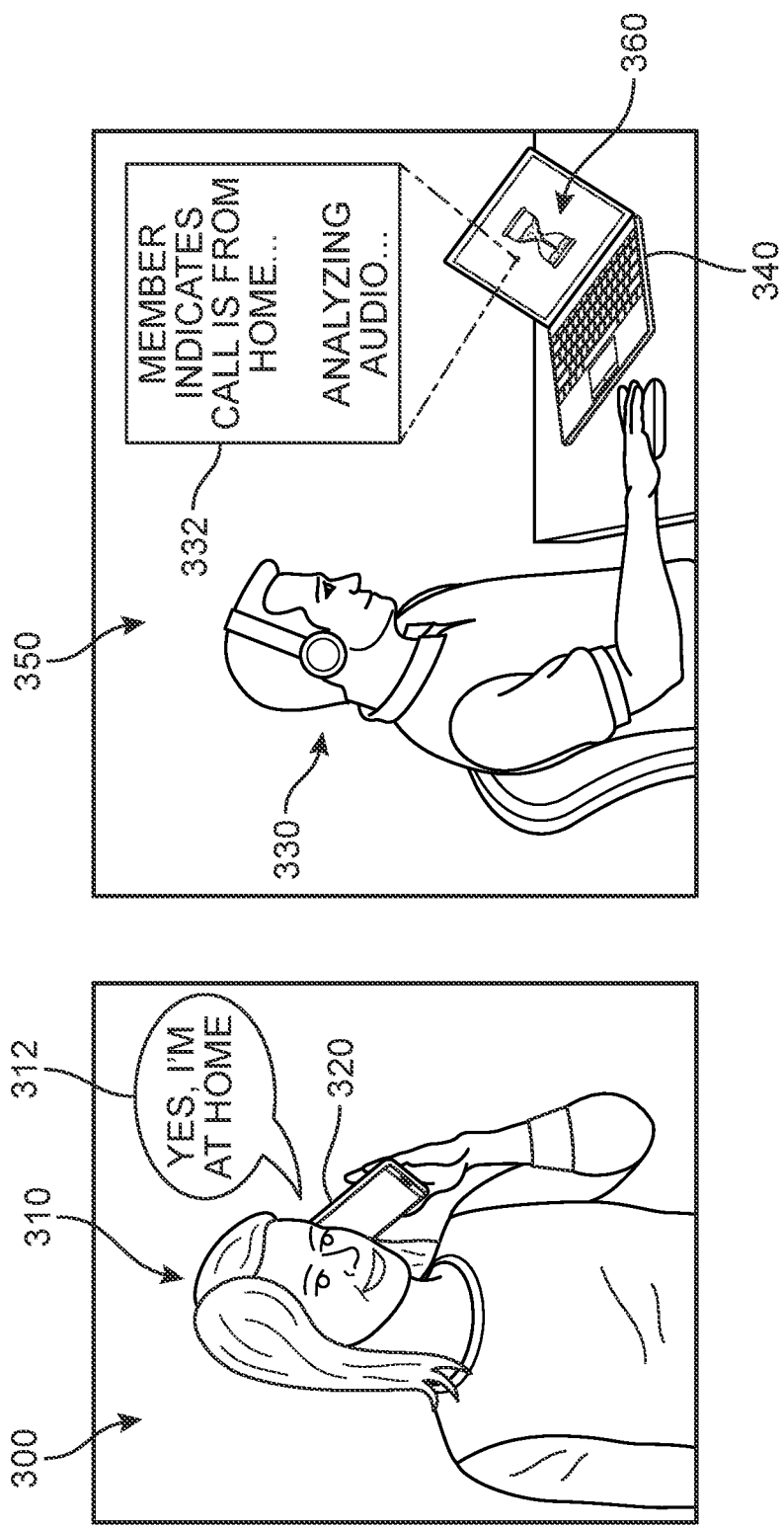
FIG. 3 depicts an example of a first person contacting a service representative for access to a secured resource, according to an embodiment.

In FIG. 3, the second user 310 indicates to the first agent 330 that she is calling from home in a first utterance 312 ("Yes, I'm at home"). This assertion may also be conveyed via a location detection component associated with the user's communication device, or a location identification capacity associated with the call center 350 communication systems. Unfortunately, as noted earlier, fraudulent calls can readily hide a caller's true location by use of various spoofing techniques, making such identifications unreliable. However, as shown in FIG. 3, embodiments of the proposed system can be configured to initiate a location-check procedure based on the ambient audio captured from second user's microphone, represented here by a first system message 332 ("Member indicates call is from home . . . Analyzing audio . . . "). For example, the audio may be captured while neither the user nor the agent is not speaking.

Figure 4:
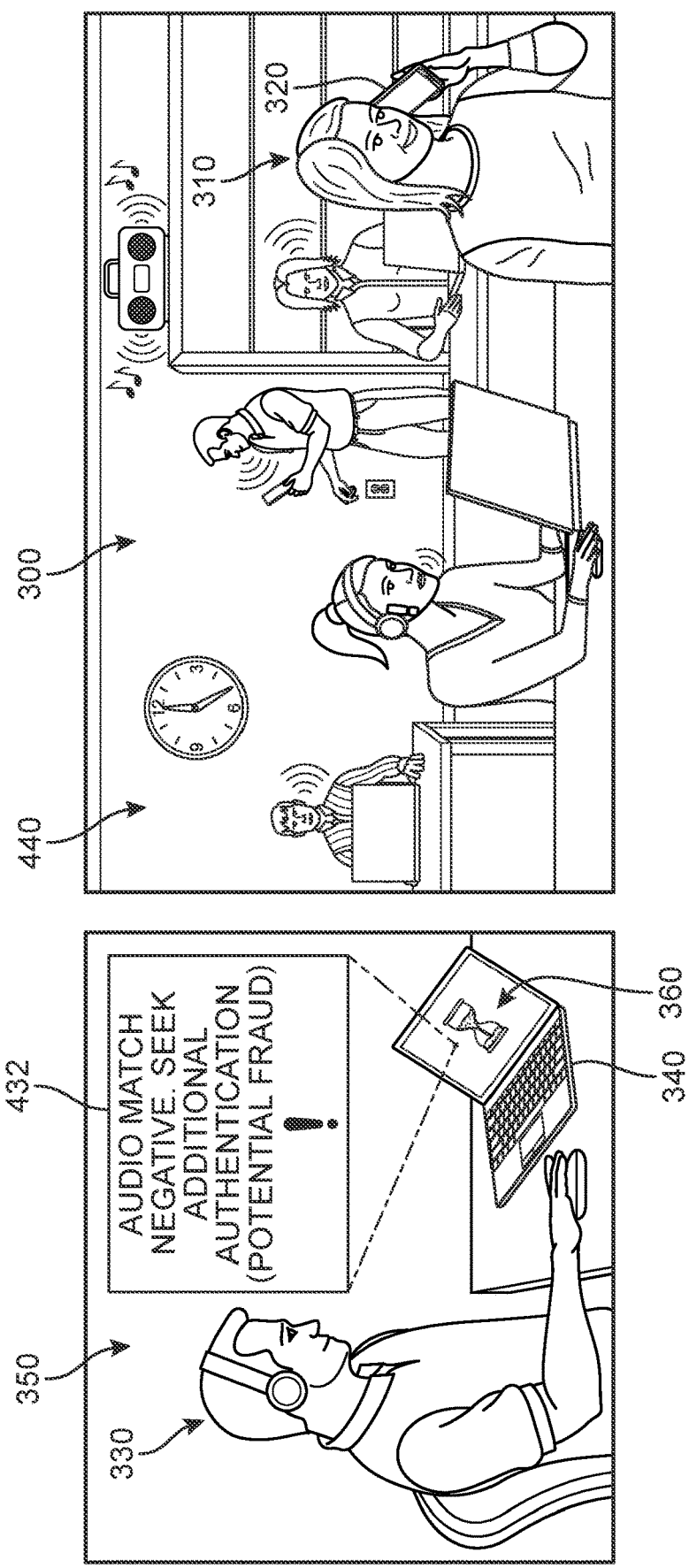
FIG. 4 depicts an example of a real-world environment associated with the first person of FIG. 3, and audio data from the environment being remotely analyzed, according to an embodiment.

In FIG. 4, it can be seen that the second user 310 is actually not at her residence, but is rather in an office environment, as represented by the number of persons 440 in the background, various office equipment, and the ongoing conversations and noise emitted by an office speaker 408. In other words, second user 310 has lied about her location and/or implemented a spoofing technique to disguise her true location. The ambient audio received by the access management platform 340 has been analyzed, and the returned score is below the acceptable threshold, indicated here by a second system message 432 ("Audio match negative. Seek additional authentication. (Potential Fraud!) ." In other words, the system has determined that the ambient sounds do not correspond to the account holder's ambient sounds for their home, based on a comparison to a reference audio data submitted by the user at an earlier date and tagged as their home/residence ambient sound sample. Upon presentation of this result, the first agent 330 can be alerted to greater likelihood of an imposter attempting to fraudulently access the true account holder's secured resources.

Figure 5:
FIG. 5 depicts an example of the audio data of FIG. 4 failing to correspond to the first person's alleged location, according to an embodiment.
Figure 5:
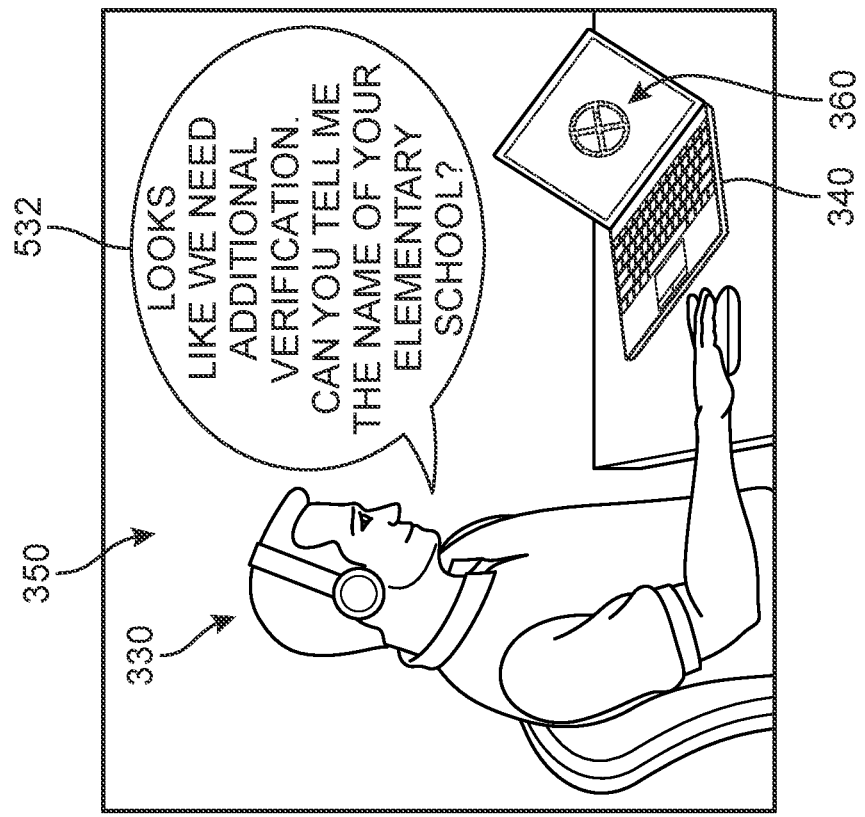
Figure 6:
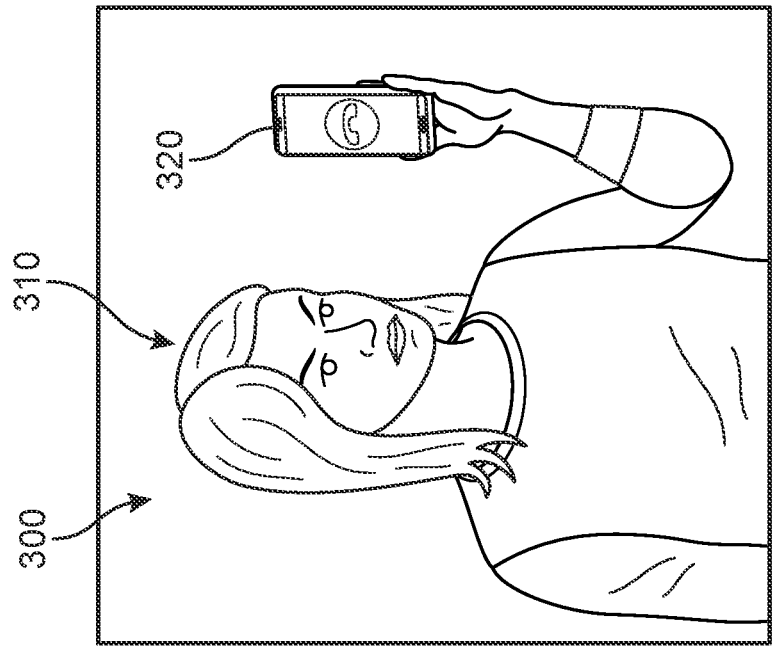
FIG. 6 depicts an example of access to the secured resource being denied, according to an embodiment.
Figure 6:
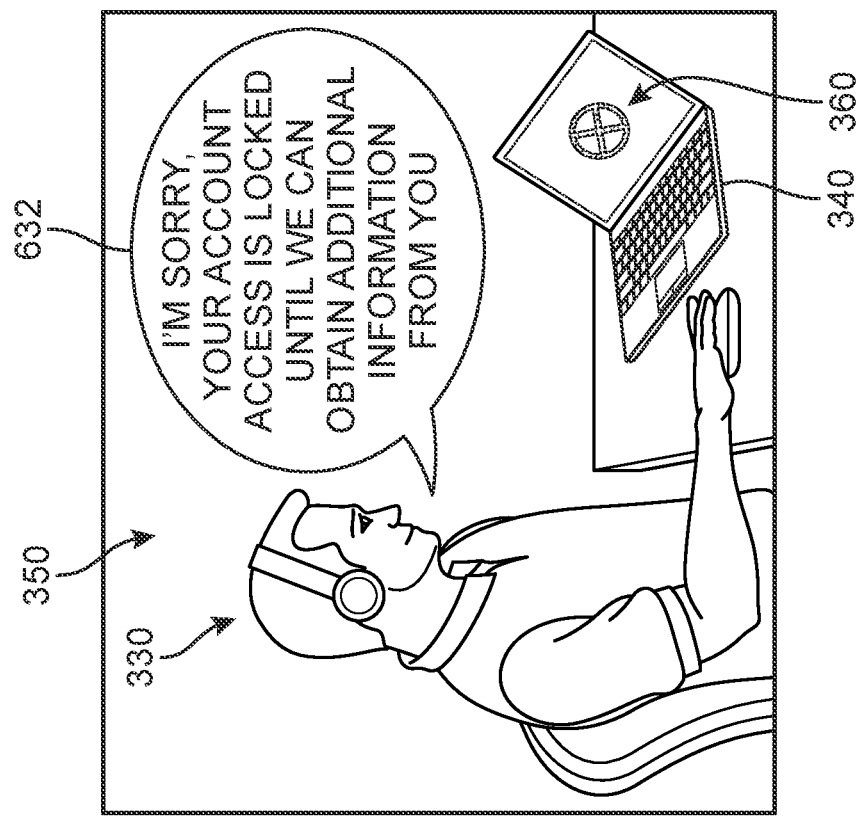

While in some cases the first agent 330 can simply end the communication session, in other cases, the first agent 330 can proceed by either reattempting the authentication process or requesting additional verification information to authenticate the user. In this case, the (imposter) second user 310 may be understood to have stolen or discovered the true account holder's username and password and/or other identity tokens, as well as spoofing the call's location, and was not expecting that any other information would be requested. In FIG. 5, the first agent 330 offers a second utterance 532 ("Looks like we need additional verification. Can you tell me the name of your elementary school?"), thereby resecuring the account pending the caller successfully responding to the security question, which takes the second user 310 by surprise, as indicated by a third utterance 512 ("Uhhh . . . Not sure . . . "). The first agent 330 can then ask another, alternate security question or seek another type of verification, or simply end the session, as indicated by a fourth utterance 632 ("I'm sorry, your account access is locked until we can obtain additional information from you."). Thus, the system has thwarted an attempt by an imposter to 'scam' the service provider into allowing access to an account holder's secured resource.

Figure 7:
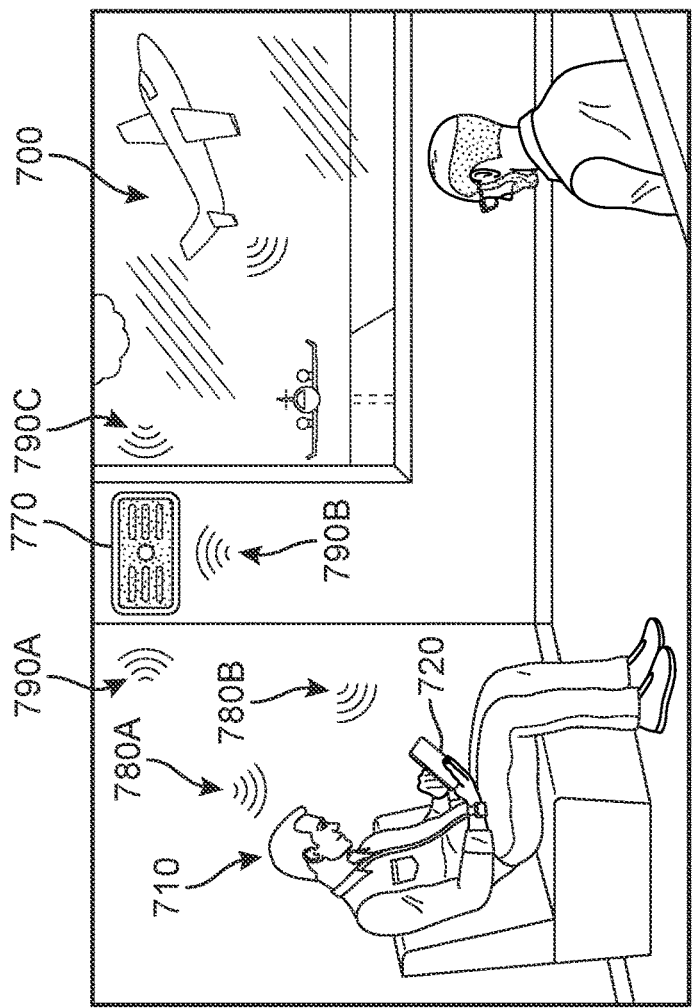
FIG. 7 is an illustration of a second person engaged in a conversation with a service representative while in a public space such as an airport and audio data from the airport being obtained along with audio data from the second person's device, according to an embodiment.
Figure 7:
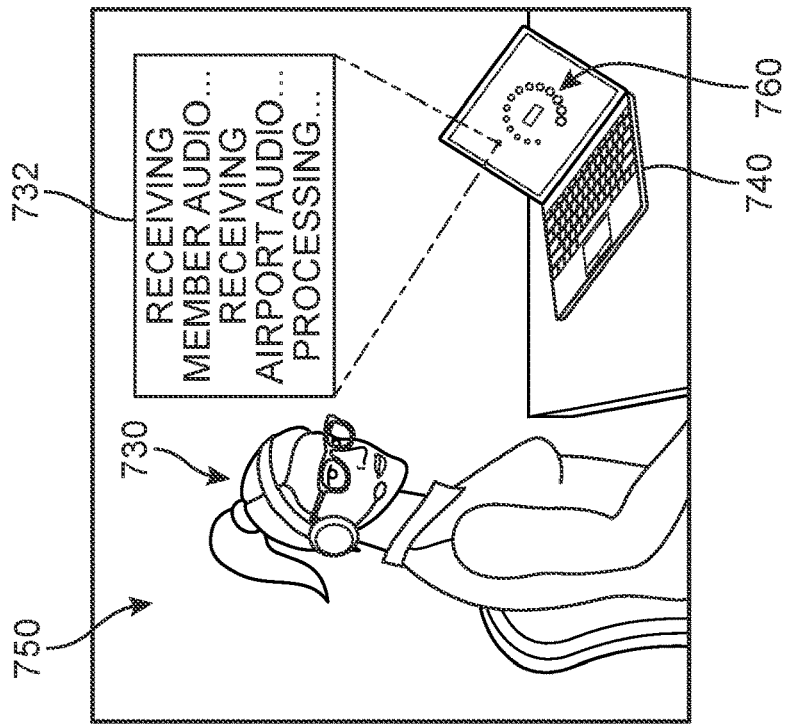
Figure 8:
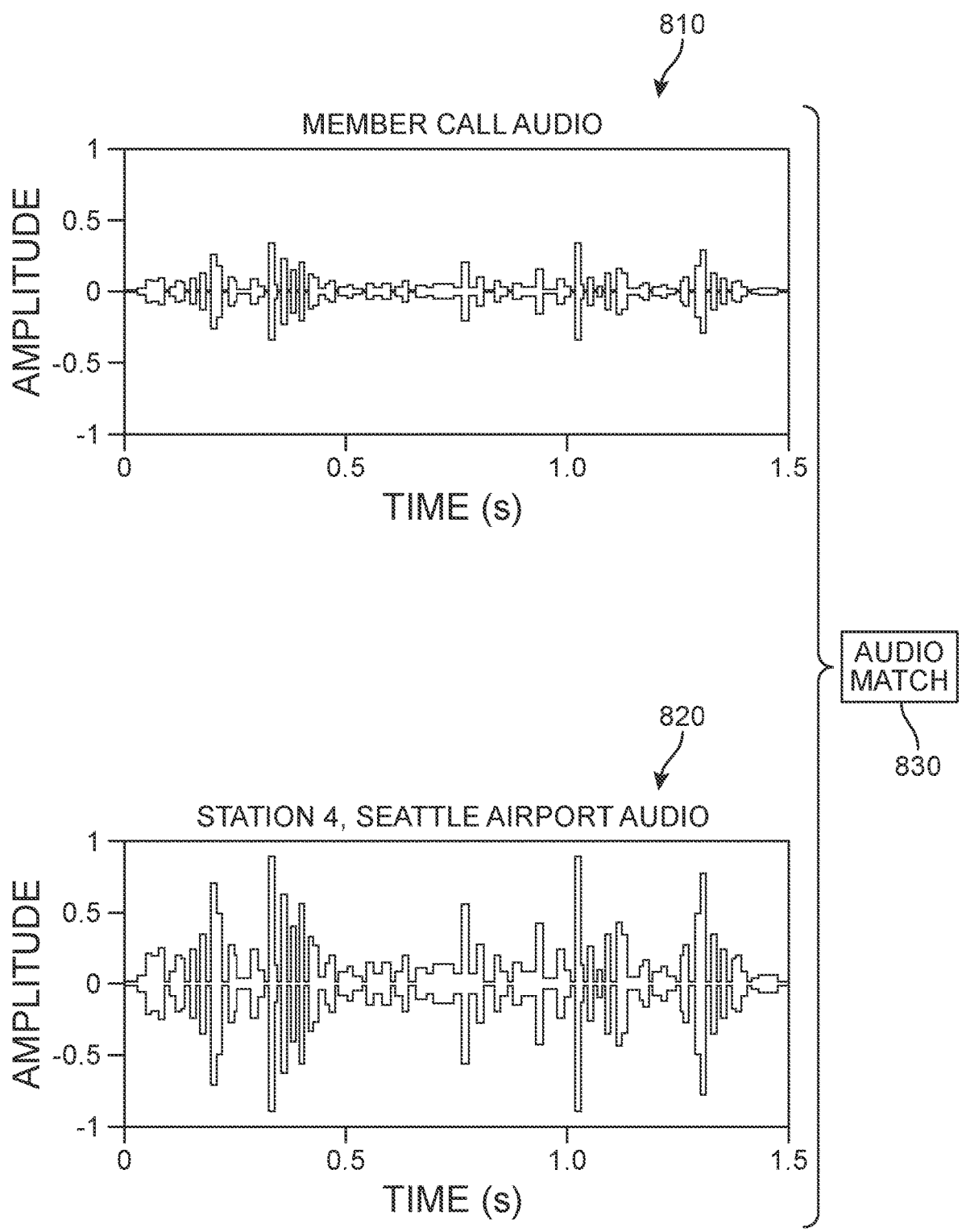
FIG. 8 is a depiction of the two samples of audio data being compared by an audio-based authentication system, and a system determination that the two samples are a match, according to an embodiment.
Figure 9:
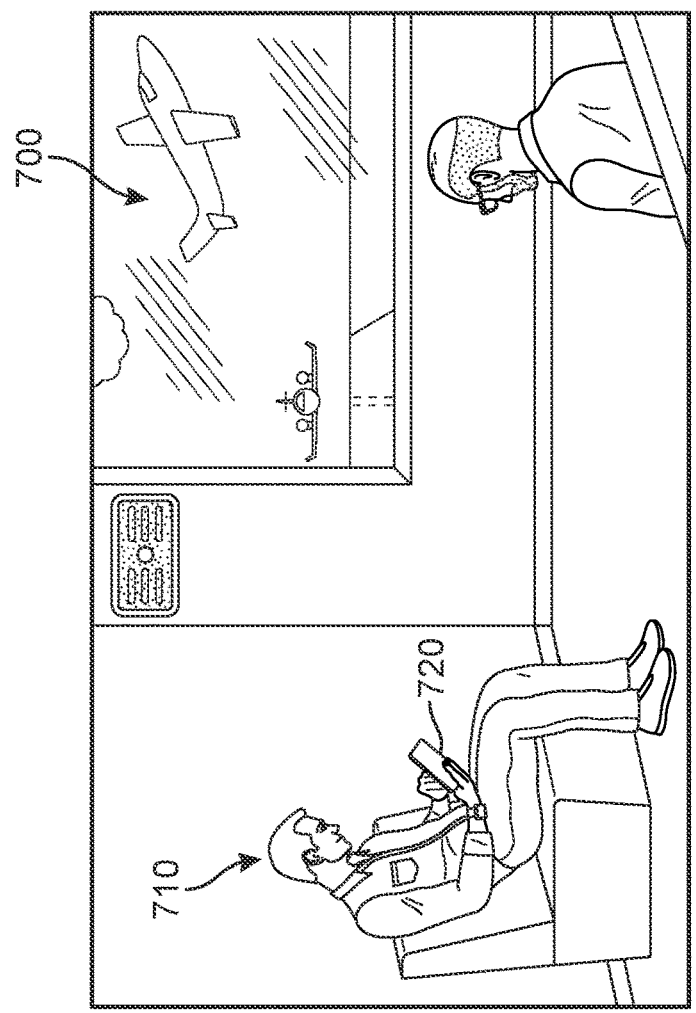
FIG. 9 is an illustration of the second person being permitted access to their user account or other secured resource, according to an embodiment.
Figure 9:
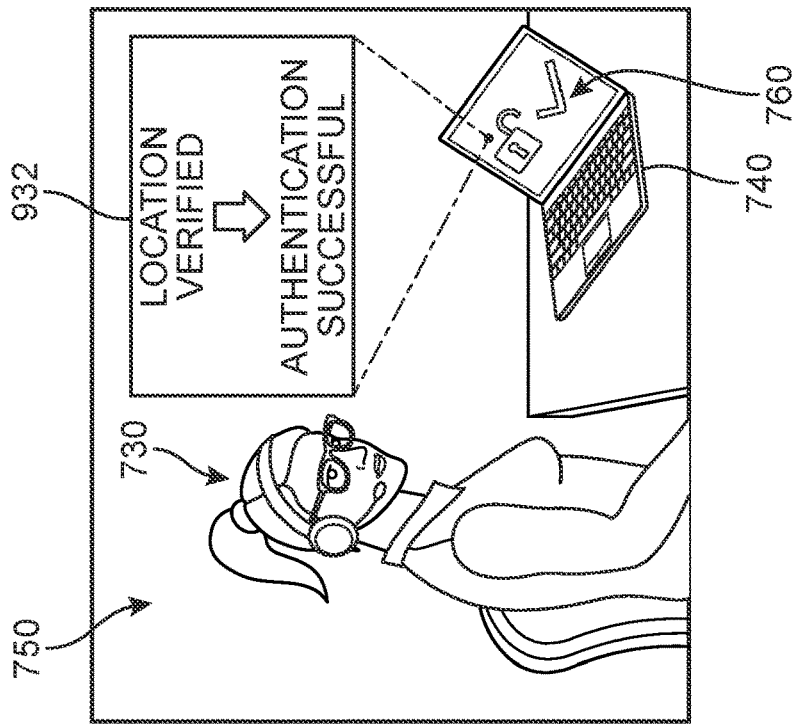

For purposes of illustration, another example of a scenario in which an embodiment of the proposed systems may be implemented is shown with reference to FIGS. 7-9. In FIG. 7, a second agent 730, located at a remote site 750 is engaged, via a computing device 740, in a video communications session ("session") with a third user 710. The computing device 740 includes or has access to an embodiment of an access management platform 760 (e.g., see platform 210 in FIG. 2). It can be understood that for purposes of this example, the second agent 730 may be any person or virtual agent associated with the secured resource of which the purported account holder is seeking access. The third user 710 is participating in the session via a mobile computing device ("mobile device") 720, such as a tablet or phone.

During the session, the third user 710 requests access to or actions dependent on sensitive or otherwise secured information associated with his account. In order to proceed, the access management system requires the third user 710 be authenticated. In one embodiment, the access management system can generate a reminder or other message to the third user 710 via mobile device 720 that audio from the device's microphone will now be captured, and/or the support agent may convey a similar message to third user 710 by voice or chat. As described herein, the proposed system can be configured to initiate a location-check procedure based on the ambient audio captured from third user's microphone, represented here by a first status message 732 ("Receiving member audio . . . Receiving airport audio . . . Processing"). For example, the audio may be captured while neither the user nor the agent is not speaking.

In FIG. 7, it can be seen that the third user 710 is located in a public space, here depicted as an airport terminal 700. In this case, there is no reference audio data previously stored by the user for the authentication. However, the platform 760 is configured to 'ping' an external audio provider or otherwise receive audio data from an audio provider that has or manages audio capture devices on-site in the public space. For example, within the vicinity of the third user 710 is a mounted audio capture device or "beacon" 770. In this case, the beacon 770 is mounted on a wall, but it should be understood the beacon can be disposed elsewhere in the environment, including the ceiling, on a table, on the floor, on a pole, on the seats, etc. The beacon 770 can receive sounds from the surrounding environment in different directions, such as sounds 790a, 790b, 790c. In different embodiments, the beacon 770 can be omnidirectional or unidirectional. In one embodiment, the beacon 770 can be configured to capture audio from one particular direction in order to better synchronize sounds with the sounds that the user's device is capturing. At or around the same time that the audio data from beacon 770 is captured, the platform causes the mobile device 720 to capture audio data from around the third user 710.

For purposes of illustration, FIG. 8 presents a schematic example of an audio comparison process 800. In this case, a first sound signal or waveform 810 representing the audio data sample received from the user's phone ("Member Call Audio") is depicted above, and a second sound signal or waveform 820 representing the audio data sample received from the airport beacon device is below. It can be seen that the two samples are substantially similar, though there is a difference in amplitude. The platform 760 analyzes the two sets of data and the returned score generated is above the acceptable threshold, thereby determining there is indeed an audio match 830. Referring to FIG. 9, in response to the successful match, the computing device 740 presents message 932 ("Location verified—Authentication successful") to second agent 730, who is now able to provide the third user 710 access to the secured resource. In some embodiments, the system is configured to automatically authenticate the user in response to a positive match and automatically release the corresponding secured resource based on this verification. The user can enjoy increased confidence in the experience of a secure access session that cannot be 'copied' by impersonation of the user's face or voice (e.g., using deep fake technology) or based on knowledge stolen by identity theft.

Figure 10:
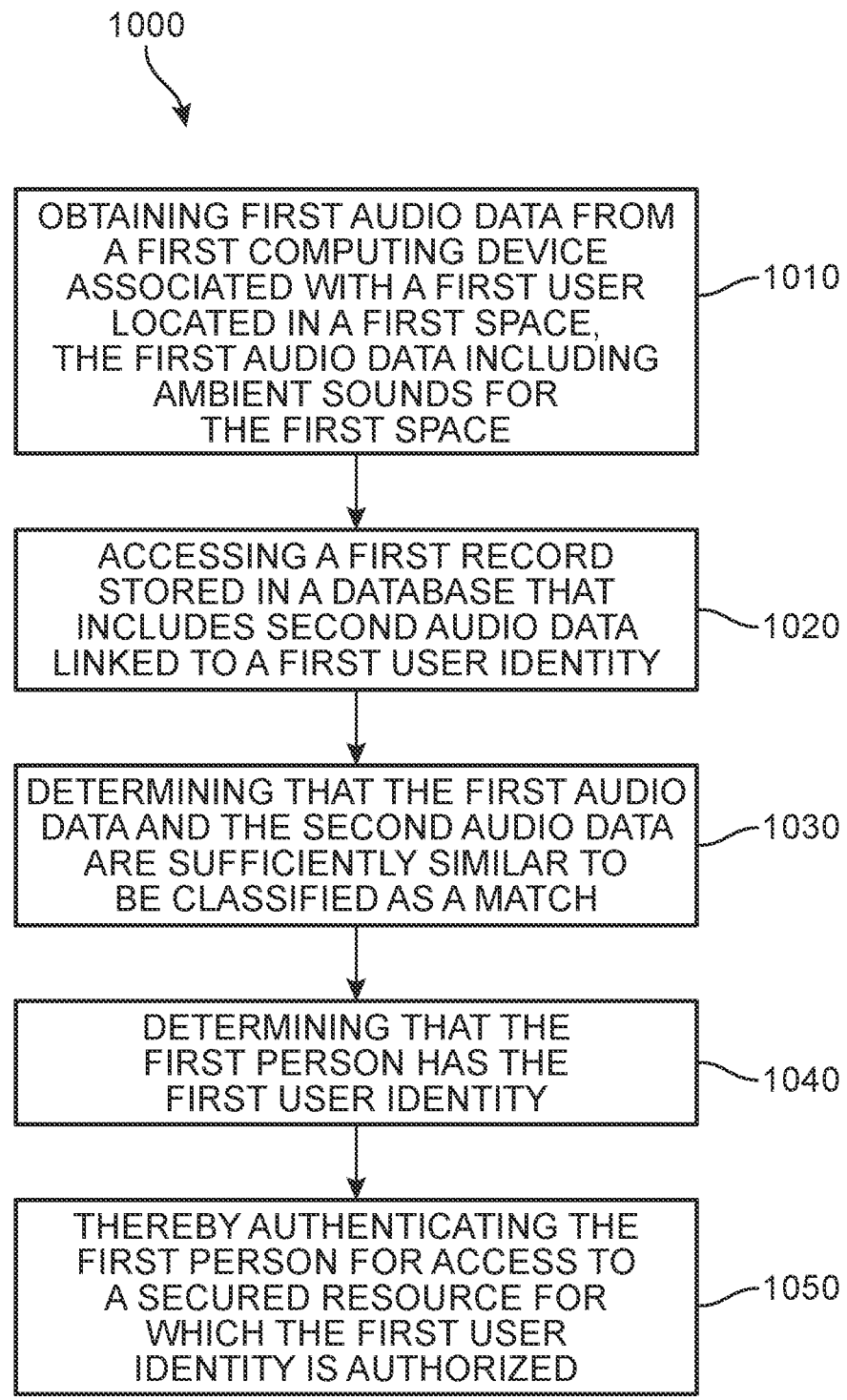
FIG. 10 is a flow chart depicting a process of authenticating a user using audio, according to an embodiment.

FIG. 10 is a flow chart illustrating an embodiment of a method 1000 of authenticating an identity of an individual. The method 1000 includes a first step 1010 of obtaining first audio data at a first time from a first computing device associated with a first user located in a first space. The first audio data include ambient sounds for the first space. A second step 1020 includes accessing a first record stored in a database, where the first record includes second audio data linked to a first user identity. A third step 1030 includes determining that the first audio data and the second audio data are sufficiently similar to be classified as a match, and a fourth step 1040 includes determining, in response to classifying the first audio data as matching the second audio data, that the first user has the first user identity. Furthermore, a fifth step 1050 includes authenticating the first user for access to a secured resource for which the first user identity is authorized.

In other embodiments, the method may include additional steps or aspects. In some embodiments, the method also includes a step of obtaining the second audio data at a second time prior to the first time. In one embodiment, the second audio data includes ambient sounds for the first space. In another example, the method further includes steps of employing, prior to the first time, a verification process to verify that the first user is associated with the first user identity, generating the first record that links the second audio data to the first user identity, and storing the first record in the database. In different embodiments, the secured resource includes one of a service, feature, and information for which access is restricted to one or more authorized persons. In one embodiment, the first audio data is obtained during a telephone or videoconferencing session between the first user and a service representative associated with the secured resource. In some examples, the method also includes steps of receiving location data for the first user corresponding to the first space, and selecting the first record based on a tag associated with the first record indicating the second audio data was obtained from the first space.

In different embodiments, the method can include additional steps of obtaining third audio data at a third time from a second computing device associated with a second user located in a second space, where the third audio data includes ambient sounds for the second space, accessing a second record stored in the database, where the second record includes fourth audio data linked to the first user identity, determining that the third audio data and the fourth audio data are insufficiently similar to be classified as a match, determining, in response to the third audio data failing to match the second audio data, that the second user may not have the first user identity (i.e., there is a high likelihood that the second space is not actually the same space as first space), and blocking the second user from accessing the secured resource. In some embodiments, the method further includes steps of receiving location data for the second user corresponding to the first space, and selecting the second record based on a tag associated with the second record indicating the fourth audio data was obtained from the first space.

Other methods can also be contemplated within the scope of this disclosure. For example, a second method of authenticating an identity of an individual is also disclosed. This method comprises a first step of obtaining a first audio sample at a first time from a first computing device associated with a first user located in a first space, the first audio sample including ambient sounds for the first space. The method also includes a second step of obtaining a second audio sample from an audio capture device located on-site in the first space at a second time that is at or around the first time, where the second audio sample corresponds, includes, or otherwise represents ambient sounds for the first space that were present around the same time as the first audio sample was captured. In addition, the method includes a third step of determining that the first audio data and the second audio data are sufficiently similar to be classified as a match, a fourth step of determining, in response to classifying the first audio data as matching the second audio data, that the first user has a first user identity, and a fifth step of thereby authenticating the first user for access to a secured resource for which the first user identity is authorized.

In other embodiments, this method may include additional steps or aspects. In one embodiment, the method also involves steps of receiving location data identifying the first space, and selecting the first audio provider service based on the received location data. In different embodiments, the secured resource includes one of a service, feature, and information for which access is restricted to one or more authorized persons. In another embodiment, the first audio data is obtained during a telephone or videoconferencing session between the first user and a service representative associated with the secured resource. In one example, the audio capture device is a mobile computing device running an instance of an application associated with a service provider of the secured resource. In another example, the audio capture device is a beacon stationed in the first space and managed by an external audio provider service.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method of authenticating an identity of an individual, the method comprising:
   obtaining first audio data at a first time from a first computing device associated with a first user located in a first space, the first audio data including ambient sounds for the first space;
   accessing a first record stored in a database, wherein the first record includes second audio data from a second time distinct from and before the first time, the second audio data associated with the first user for a personal space linked to the first user;

maintaining a samples repository of pre-recorded audio patterns that represent ambient noise for specific public locations;
identifying the first space as possibly the personal space linked to the first user or a public space;
comparing the first audio data and the second audio data when the first space is possibly the personal space;
comparing the first audio data to one of the pre-recorded audio patterns when the first space is possibly the public space;
capturing sample audio data at the first time automatically using a second computing device associated with a second user and located near the first computing device;
comparing the second audio data to the sample audio data;
determining, in response to the comparison of the first audio data to the second audio data and the second audio data to the sample audio data or to the comparison of the first audio data to one of the pre-recorded audio patterns and the second audio data to the sample audio data, that the first space is the personal space linked to the first user or a verified public space; and
authenticating the first user for access to a secured resource for which the first user is authorized based only on at least one of a match between the first space and the personal space or the first space and the verified public space and the comparison of the second audio data to the sample audio data.

2. The method of claim 1, wherein the second audio data includes ambient sounds for the first space.

3. The method of claim 1, further comprising:
employing, prior to the first time, a verification process to verify that the first user is associated with the first user identity;
generating the first record that links the second audio data to the first user identity; and
storing the first record in the database.

4. The method of claim 1, wherein the secured resource includes one of a service, feature, and information for which access is restricted to one or more authorized persons.

5. The method of claim 1, wherein the first audio data is obtained during a telephone or videoconferencing session between the first user and a service representative associated with the secured resource.

6. The method of claim 1, further comprising:
receiving location data for the first user corresponding to the first space; and
selecting the first record based on a tag associated with the first record indicating the second audio data was obtained from the first space.

7. The method of claim 1, further comprising:
obtaining third audio data at a third time from a second computing device associated with a second user located in a second space, the third audio data including ambient sounds for the second space;
accessing a second record stored in the database, wherein the second record includes fourth audio data associated with the first user for a second personal space linked to the first user;
comparing the third audio data and the fourth audio data;
determining, in response to the comparison of the third audio data to the fourth audio data, that the second space is not the second personal space associated with the first user; and
blocking the second user from accessing the secured resource based on the lack of a match between the second space and the second personal space.

8. The method of claim 7, further comprising:
receiving location data for the second user corresponding to the second space; and
selecting the second record based on a tag associated with the second record indicating the fourth audio data was obtained from the second space.

9. A method of authenticating an identity of an individual, the method comprising:
obtaining first audio data at a first time from a first computing device associated with a first user located in a first space associated with the first user, the first audio sample data including ambient sounds for the first space;
obtaining second audio sample data from an audio capture device located on-site in the first space at a second time that is distinct from and before the first time, the second audio sample data corresponding to ambient sounds for the first space;
identifying the first space as possibly the personal space linked to the first user or a public space;
comparing the first audio data and the second audio data when the first space is possibly the personal space;
comparing the first audio data to one of a plurality of pre-recorded audio patterns that represent ambient noise for specific public locations when the first space is possibly the public space;
capturing sample audio data at the first time automatically using a second computing device associated with a second user and located near the first computing device;
comparing the second audio data to the sample audio data;
determining, in response to the comparison of the first audio data to the second audio data and the second audio data to the sample audio data or to the comparison of the first audio data to one of the pre-recorded audio patterns and the second audio data to the sample audio data, that the first space is the personal space linked to the first user or a verified public space; and
authenticating an identity of the first user for access to a secured resource for which the first user is authorized based only on the determination that the second audio data were from the first space or the determination that the first space is the verified public space.

10. The method of claim 9, further comprising:
receiving location data identifying the first space; and
selecting a first audio provider service based on the received location data.

11. The method of claim 9, wherein the secured resource includes one of a service, feature, and information for which access is restricted to one or more authorized persons.

12. The method of claim 9, wherein the first audio data is obtained during a telephone or videoconferencing session between the first user and a service representative associated with the secured resource.

13. The method of claim 9, wherein the audio capture device is a mobile computing device running an instance of an application associated with a service provider of the secured resource.

14. The method of claim 9, wherein the audio capture device is a beacon stationed in the first space and managed by an external audio provider service.

15. A system for authenticating an identity of an individual, the system comprising a processor and machine-readable media including instructions which, when executed by the processor, cause the processor to:

obtain first audio data at a first time from a first computing device associated with a first user located in a first space, the first audio data including ambient sounds for the first space;

access a first record stored in a database, wherein the first record includes second audio data from a second time distinct from and before the first time, the second audio data associated with the first user for personal space linked to the first user identity;

maintain a samples repository of pre-recorded audio patterns that represented ambient noise for specific public locations;

identify the first space as possibly the personal space linked to the first user or a public space;

compare the first audio data and the second audio data when the first space is possibly the personal space;

compare the first audio data to one of the pre-recorded audio patterns when the first space is possibly the public space;

capture sample audio data at around the first time automatically using a second computing device associated with a second user and located near the first computing device;

compare the second audio data to the sample audio data;

determine, in response to the comparison of the first audio data to the second audio data and the second audio data to the sample audio data or to the comparison of the first audio data to one of the pre-recorded audio patterns and the second audio data to the sample audio data, that the first space is the personal space linked to the first user or a verified public space; and authenticate the first user for access to a secured resource for which the first user is authorized based only on at least one of a match between the first space and the personal space or the first space and the verified public space and the comparison of the second audio data to the sample audio data.

16. The system of claim 15, wherein the instructions further cause the processor to obtain the second audio data at a second time prior to the first time.

17. The system of claim 16, wherein the second audio data includes ambient sounds for the first space.

18. The system of claim 15, wherein the instructions further cause the processor to:
employ, prior to the first time, a verification process to verify that the first user is associated with the personal space;
generate the first record that links the second audio data to the first user identity; and
store the first record in the database.

19. The system of claim 15, wherein the secured resource includes one of a service, feature, and information for which access is restricted to one or more authorized persons.

* * * * *